Patented Feb. 2, 1943

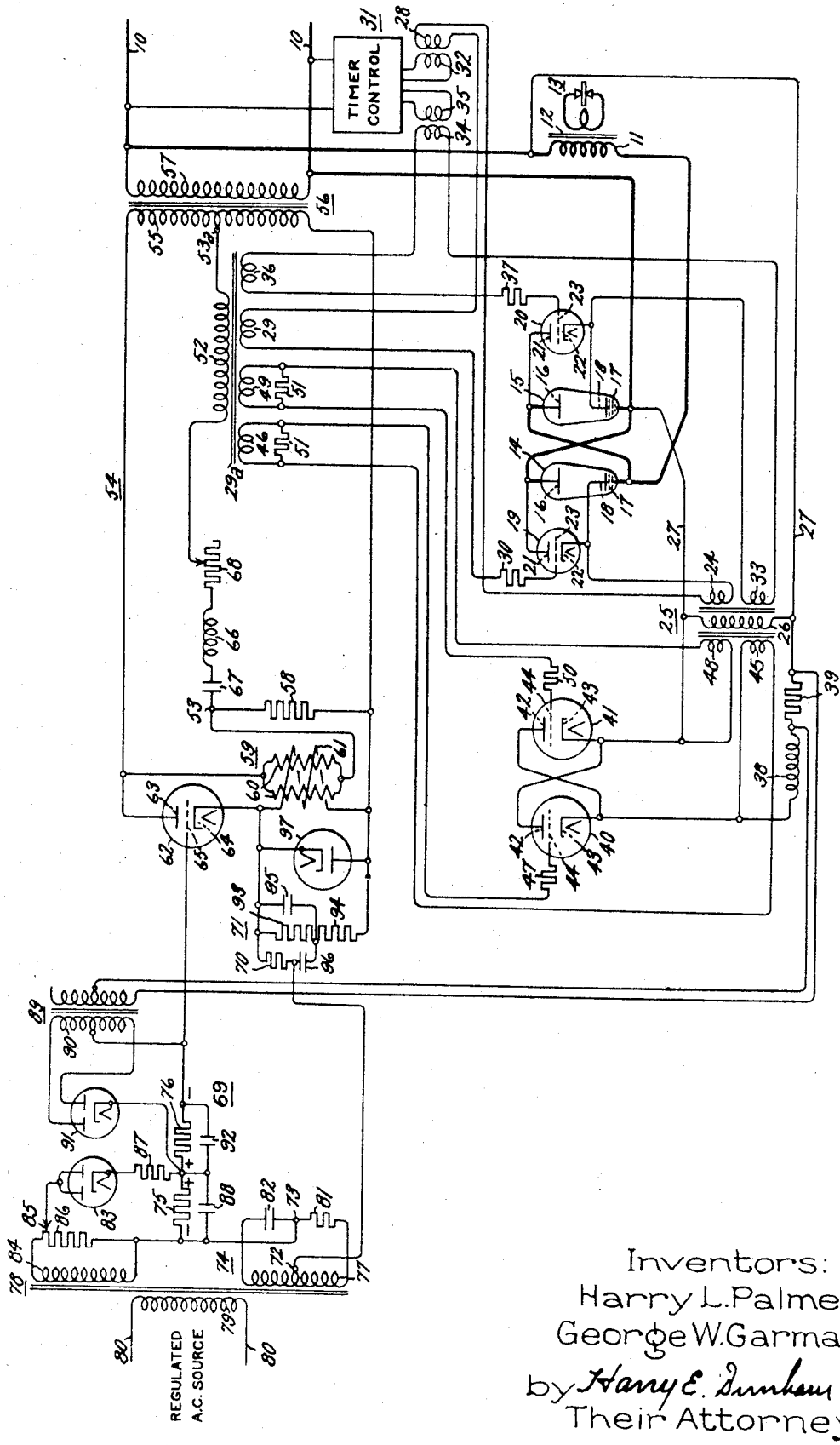

2,310,112

UNITED STATES PATENT OFFICE 2,310,112

ELECTRIC CONTROL CIRCUIT

Harry L. Palmer, Schenectady, and George W. Garman, Glenville, N. Y., assignors to General Electric Company, a corporation of New York Application July 1, 1941, Serial No. 400,684

7 Claims. (Cl. 171—119)

Our invention relates to electric control circuits, and more particularly to an improved electric control circuit which is particularly adapted for controlling the current supplied to a resistance welding circuit through electric discharge valves in such a manner that the welding current is substantially independent of voltage fluctuations of the supply circuit.

It has been customary to supply a resistance welding circuit including a welding transformer from an alternating current supply circuit through electric discharge valves which are connected to supply alternating current to the welding transformer. In systems of this character difficulty has been experienced in maintaining the welding current substantially independent of voltage fluctuations of the alternating current supply circuit. It is essential that the effect of these fluctuations on the welding current be reduced to a minimum since the variation of current from a predetermined value which may be permitted without materially decreasing the quality of the weld is very small. To this end, various arrangements have been provided for minimizing variations in welding current resulting from source voltage fluctuations. Some of these systems have utilized voltage responsive means for introducing a predetermined change in the control member excitation of the main electric valves for a predetermined change of voltage at the source. It would be more desirable to regulate in accordance with the welding current. However, in such a system difficulty is encountered because the load is intermittently energized and it is therefore impossible to provide a continuous regulation in response to load circuit. In order to overcome this latter difficulty it has been suggested that an auxiliary continuously energized load be provided, which has the electrical characteristics of the main welding load circuit and which is energized through electric valves in substantially the same manner as the welding load. In this way, both the electric valves which energized the welding circuit and those which energize the auxiliary load circuit may be controlled in the same manner in response to the current or voltage of the auxiliary load circuit. A system of this character would appear to offer numerous advantages but those so far proposed have failed to give the desired speed and accuracy of control. These systems have also required an inordinate amount of equipment which renders them undesirable from the cost as well as the operation and maintenance standpoints. In accordance with the teachings of our invention we provide an improved control circuit of the above type which overcomes these disadvantages and provides a relatively simple and reliable control of the main electric valves to render the welding current substantially independent of voltage fluctuations of the supply circuit. A circuit embodying our invention is characterized in its operation by the high speed and accuracy of the control accomplished.

It is an object of our invention to provide a new and improved electric control circuit.

It is another object of our invention to provide a new and improved electric control circuit for supplying a load through electric valves which renders the load current substantially independent of source voltage fluctuations.

It is a still further object of our invention to provide a new and improved control circuit for continuously controlling the excitation of the control members of electric discharge valve means which control the supply of energy to an intermittently energized load.

It is still another object of our invention to provide an electric control circuit for maintaining the current supplied to an intermittently energized load substantially independent of voltage fluctuations of the supply circuit and which is characterized in its operation by rapid response and accuracy of the control effected.

In accordance with the illustrated embodiment of our invention, the welding transformer of a resistance welding circuit is energized from an alternating current supply circuit through a pair of reversely connected electric discharge valves. The welding circuit is adapted to be energized intermittently, either in accordance with a predetermined pattern or at will under the control of an operator. The conductivities of the main electric valves are controlled to render the current supplied to the welding circuit independent of source voltage fluctuations in response to an electrical condition of an auxiliary load which has the characteristics of the welding circuit and which is supplied from the alternating current source through a pair of auxiliary electric valves which are connected generally in the same manner as the main electric valves. The main and auxiliary electric valves are controlled in response to a voltage derived from the auxiliary load circuit to vary continuously the excitation of both the auxiliary and main electric discharge valves in response to variations of the current supplied to the auxiliary load circuit. The means for effecting this control includes a phase shifting circuit and an improved arrangement for controlling the phase shifting circuit in response to the current supplied to the auxiliary load circuit including means for introducing a voltage into the control circuit which opposes the signal produced by a current change through the auxiliary load circuit.

Our invention will be better understood by reference to the following description taken in connection with the accompanying drawing and its scope will be pointed out in the appended claims. In the drawing, the single figure is a schematic representation of one embodiment of our invention.

Referring now to the single figure of the drawing, we have shown our invention embodied in a control circuit for controlling the transfer of energy between an alternating current supply circuit 10 and an alternating current load circuit such as the primary winding 11 of a welding transformer 12 having the secondary winding connected to supply a work circuit 13. Current from the supply circuit 10 flows through the welding transformer 12 under the control of a pair of reversely connected electric discharge valves 14 and 15 which are connected back to back, or in anti-parallel relation, and as illustrated each comprises an envelope enclosing an anode 16, a cathode 17 of conducting liquid such as mercury, and an immersion-igniter type of control member 18. As is well understood by those skilled in the art, this circuit is effective to transmit current during both half-waves of the alternating current supply circuit voltage to the welding transformer 12, with the electric valve means 14 and 15 being rendered conductive when the anodes thereof are positive and the associated igniter member conducts a predetermined minimum current capable of initiating a discharge between the anodes and the pool type cathodes 17.

The flow of current through the immersion-igniter control members 18 of the valves 14 and 15 is controlled by the trigger or firing valves 19 and 20 which are associated with the valves 14 and 15, respectively. Each of the valves 19 and 20 is preferably of the type containing an ionizable medium such as a gas or vapor and each comprises an anode 21, a filamentary type cathode 22 and a control member or grid 23. As illustrated in the drawing, the anode-cathode circuit of each of the valves 19 and 20 is connected in circuit between the anode 16 and control member 18 of the main electric valve with which it is associated. The circuit between the cathode 22 and control member 23 of each of the valves 19 and 20 includes a source of hold-off or biasing voltage, a source of firing voltage under the control of suitable timing means for determining the number of half-cycles during which current shall be supplied to the welding circuit, and a source of variable phase peaked wave form voltage for determining the time in each half-cycle of the supply circuit voltage at which the valves shall be rendered conductive.

Referring now more particularly to the specific form of the apparatus illustrated in the drawing, the circuit between the cathode 22 and the control member 23 of the firing valve 19 includes in series a secondary winding 24 of a transformer illustrated generally by numeral 25 and having a primary winding 26 energized from the alternating current supply circuit 10 through conductor 27; a source of alternating voltage comprising a transformer secondary winding 28 and a source of variable phase peaked wave form voltage comprising the secondary winding 29 of a peaking transformer 29a. A current limiting resistor 30 is also connected in circuit with the control member. The voltage of winding 24 is substantially 180 degrees out of phase with the anode-cathode voltage of the electric valve 14. The voltage of winding 28 is derived from the primary winding 32 which is periodically energized from the alternating current supply circuit 10 under the control of a suitable timing control system illustrated schematically by the timing control device 31. The voltage of winding 28 is substantially in phase with the anode-cathode voltage of the electric valve means 14 and in phase opposition to the voltage of winding 24. Similarly, the cathode-to-control member circuit of the firing valve 20 includes a secondary winding 33 of transformer 26, winding 34 of a transformer having the primary winding 35 thereof periodically energized from the alternating current source 10 under the control of the timing control 31, a source of variable phase periodic voltage of peaked wave form comprising a transformer secondary winding 36 and a current limiting resistor 37.

Since the welding transformer 12 is arranged to be intermittently energized through the action of the timing control 31, I provide a source of continuous control which is at all times related to the magnitude of welding current that would flow if the welding circuit were energized at that instant. To this end I provide an auxiliary or dummy load including an inductive element 38 and resistor 39 which are proportioned to approach as closely as possible the electrical characteristics of the welding circuit 13 and energized continuously from the alternating current supply circuit 10 through the auxiliary electric valves 40 and 41. The valves 40 and 41 are preferably of the type utilizing an ionizable medium such as a gas or vapor and each comprises an anode 42, a cathode 43 of the filamentary type, and a control member or grid 44. The valves 40 and 41 are reversely connected with respect to the alternating current voltage of the source 10 and are energized therefrom through the conductors 27. The control member-to-cathode circuit of auxiliary valve 40 includes a secondary winding 45 of transformer 26 and a source of voltage of peaked wave form comprising a secondary winding 46 of transformer 29a. A suitable current limiting resistor 47 is also provided in circuit with the control member 44. Similarly, the cathode-to-control member circuit of valve 41 includes a secondary winding 48 of transformer 26, a secondary winding 49 of transformer 29a and a suitable current limiting resistor 50. The transformer windings 46 and 49 provide an alternating current bias which tends to render the valves 40 and 41 nonconductive. It will be noted that the main electric valves 14 and 15 and the auxiliary electric valves 40 and 41 are controlled in accordance with the voltage of transformer windings 29, 36, 46, 49, respectively, which are the secondary windings of the common saturable or peaking transformer 29a. Suitable resistors 51 may be provided in parallel with the windings 46 and 49 to limit the negative voltage peaks induced in these windings. In accordance with the present invention the phase of the voltage impressed on the primary winding 52 of the peaking transformer 29a is controlled in accordance with the current supplied to the resistance element 39 of the auxiliary load circuit so that the phase of the periodic voltages of peaked wave form supplied to the control circuits of the firing valves 19 and 20 as well as the control members of the auxiliary valves 40 and 41 are all controlled in accordance with an electrical condition of the continuously energized auxiliary load circuit. In this way the excitation of the main valves is maintained proper at all times to compensate for voltage variations in the alternating current supply circuit 10.

Referring again to the drawing, the primary winding 52 of the peaking transformer 29a is energized in accordance with the voltage appearing between the output terminals 53 and 53a of a phase shifting circuit illustrated generally by the numeral 54 and comprising the secondary winding 55 of a transformer 56 and serially connected impedance elements connected across the end terminals of the winding 55 including a resistance 58 and a saturable inductive impedance device illustrated generally by the numeral 59. The primary winding 57 of transformer 56 is connected to be energized from the alternating current circuit 10. The device 59 comprises reversely wound and parallel connected windings 60 which are connected in series with the resistor 58 with the common terminal thereof forming the output terminal 53 of the phase shifting network. The device 59 also includes a direct current or control winding 61 which is connected across the end terminals of the winding 55 through a suitable unilaterally conductive device such as an electric discharge valve 62 of the type utilizing an ionizable medium such as a gas or vapor and comprising an anode 63, a cathode 64 and a control member or grid 65. Connected in series with the primary winding 52 and between the output terminals 53 and 53a of the phase shifting circuit 54 is a filter circuit comprising a series connected inductance 66 and capacitance 67. A resistor 68 having a variable tap is also connected in series with the winding 52. A peaking transformer and circuit therefor including the series resistance and filter is not our invention and is described and claimed in Patent 2,246,177, dated June 17, 1941, and assigned to the same assignee as the present invention.

It will be apparent to those skilled in the art that the phase of the voltage impressed on the winding 51 of the transformer 29a may be varied by varying the conductivity of the electric discharge valve 62 which in turn is effective to vary the impedance of the device 59. For example, an increase in the conductivity of the valve 62 is effective to increase the current through the control winding 60 which in turn increases the saturation of the device 59 and decreases the impedance of the winding 60. This decrease in the magnitude of the inductive impedance advances the phase of the voltage supplied to the winding 52.

In accordance with an important feature of our invention the impedance of the winding 60 is automatically controlled in an improved manner in accordance with an electrical condition of the resistance element 39 of the auxiliary load circuit by a control circuit illustrated generally by the numeral 69. The cathode-to-control member circuit of the electric valve 62 includes a resistor 70 for inserting in the circuit of the control member thereof a voltage derived from the terminals of the direct current control winding 60 by means of an anti-hunting circuit illustrated generally by the numeral 71. In addition to the resistor 70 the cathode-to-control member circuit of the valve 62 includes the terminals 72 and 73 of a static phase shifting circuit 74, and series connected resistors 75 and 76 across which are impressed respectively a unidirectional voltage of constant magnitude and an opposing unidirectional voltage having a magnitude dependent upon the current supplied to the resistor 39 of the auxiliary load circuit. The alternating current voltage appearing between terminals 72 and 73 is substantially in lagging quadrature relation with respect to the alternating current circuit 10. As illustrated in the drawing, the terminal 72 is the midpoint of a secondary winding 77 of a transformer 78 having a primary winding 79 which is energized from a source of regulated A. C. voltage 80 having a fixed phase relation with respect to the alternating current supply circuit 10 and is preferably derived therefrom by means of a regulating transformer (not shown). The terminal 73 of the phase shifting circuit is the common terminal of a serially connected resistor 81 and capacitor 82 which are connected across the end terminals of the transformer winding 77. The unidirectional voltage appearing across resistor 75 may also to advantage be obtained from the transformer 79 by means of an electric valve 83 which is energized in accordance with a portion of the voltage appearing across a secondary winding 84 of the transformer 78. The portion of the voltage of winding 84 impressed on the valve 83 may be varied by varying the position of the movable tap 85 of a resistor 86 connected across the end terminals of the winding 84. The anode-cathode circuit of the valve 83 includes a resistor 87 in addition to the resistor 75 which is connected in circuit with the control member 65 of the valve 62. A suitable filtering capacitor 88 is connected in parallel with the resistor 75 to minimize the ripple voltage appearing between the terminals thereof.

The voltage appearing across resistor 76 is derived from the voltage appearing across the resistance element 39 of the auxiliary load circuit by means of a transformer 89 having a midtapped secondary winding 90, and end terminals which are associated with the anodes of a double anode electric valve 91. The midtap is connected to one terminal of resistor 76. The other terminal of resistor 76 is connected with the cathode of the valve 91. A suitable filtering capacitor 92 is connected in parallel with the resistor 76. As previously mentioned, the voltage across the resistor 70 is derived from an anti-hunting circuit 71 in response to a change in the voltage across the terminals of the direct current control winding 60. The anti-hunting circuit includes series connected resistors 93 and 94 connected across the terminals of control winding 61. A capacitor 95 is connected in parallel with resistor section 93 to render the voltage across the terminals of resistor 93 more nearly a pure direct current voltage. The resistor 70 is connected in series with a capacitor 96 across the end terminals of the resistor section 93. The common terminal of resistor 70 and capacitor 96 is connected to the intermediate terminal 72 of the phase shifting circuit 74. A suitable unilaterally conductive device 95 is connected across the terminals of the direct current winding 61 to provide a path for the current flow through winding 61 during the half cycle of the voltage of source 10 that the electric discharge valve 62 is not conductive.

The operation of the anti-hunting circuit will now be described. Assuming a predetermined value of current flowing through the winding 61 there will be a direct current voltage across the terminals thereof of predetermined magnitude. This voltage will include an alternating component which is filtered by the cooperation of the capacitor 95 with the resistor sections 93 and 94 so that a substantially pure direct current voltage is impressed across the resistor 70 and the capacitor 96. If the voltage across the terminals of winding 61 is maintained the condenser 96 will be charged to the full voltage of the resistor section 93. If now, due to a decrease in the conductivity of the valve 62 the voltage across resistor section 93 is decreased condenser 96 will cause a current to flow through the resistor 70 in such a direction that the common terminal of the resistor and capacitor will be positive with respect to the opposite terminal of resistor 70. With this polarity, the voltage across the resistor 70 tends to increase the conductivity of the electric valve 62 so that the change in conductivity of the electric valve 62 will be less than that which would have taken place without the anti-hunting circuit 71. In the same manner, if the conductivity of the valve 62 increases the condenser 96 will charge through the resistor 70 and cause a voltage drop thereacross in a direction to decrease the conductivity of the valve 62.

The features and advantages of our invention will be better understood by a consideration of the operation of the system as a whole. Let us consider first the condition of the various portions of the system when the voltage of the alternating current source 10 has a predetermined magnitude and the timing control is operating to render the main electric valves periodically conducting for a predetermined number of cycles. During the interval that the main electric valves 14 and 15 are rendered conducting by the timing control the point in each cycle of the voltage wave of the alternating current source 10 at which the valves are rendered conductive is controlled by the phase relation of the voltage wave of the windings 29 and 36. If the voltage of the source 10 remains constant or rather if the current supplied to the auxiliary load circuit remains constant the phase relation of these voltage peaks remains fixed at a given position dependent upon the phase of the output voltage of the phase shifting circuit 54. This is true, since as long as the current through the resistant element 39 of the auxiliary load circuit remains fixed the output of the electric valve 91 and consequently the voltage across resistor 76 remains fixed and valve 62 is maintained at a predetermined state of conductivity. Assume now that the current through the resistance element 39 of the auxiliary load increases due, for example, to an increase in voltage of the alternating current source. As a result the voltage across resistance element 76 increases and, as indicated in the drawing, opposes the fixed voltage across resistor 75. The net effect is an increase in the unidirectional bias on the control member in a negative direction. The control member is energized by an alternating current component in addition to the bias and the effect of increasing this bias negatively is to retard the phase of the excitation of the valve 62. This in turn decreases the conductivity of the valve 62 and the saturation of the device 59 so that the impedance thereof is increased. An increase in the magnitude of the inductive impedance of the phase shifting circuit 54 is effective to retard the phase of the peaked wave form voltages impressed on the control members controlling the main electric valves 14 and 15 supplying the welding circuit and also the control members of the auxiliary valves 40 and 41 supplying the auxiliary load circuit. Conversely, if the current through the resistor 39 decreases, due for example to a decrease in the voltage of source 10, the voltage across resistor 76 becomes smaller in magnitude and the conductivity of valve 62 is increased. This in turn increases the saturation of the inductance device 59 and advances the phase of the potential supplied to the main electric valves 14 and 15 as well as the auxiliary valves 40 and 41 and tends to restore the current through the auxiliary load to the desired value. The operation of the anti-hunting circuit 71 in response to voltage variations across the control winding 61 to avoid undesirable fluctuations in the control effected has been described in detail.

The circuit of the present invention has been found to provide reliable and accurate continuous control of current supplied to an intermittently energized load through controlled electric discharge valves and has particularly eliminated undesirable hunting.

While we have shown and described a particular embodiment of our invention, it will be obvious to those skilled in the art that changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States is:

1. In combination, an alternating current supply circuit, an alternating current load circuit, reversely connected electric valve means interconnecting said circuits for transmitting energy therebetween, an auxiliary load circuit having electrical characteristics corresponding to the characteristics of said load circuit, reversely connected auxiliary electric valves interconnecting said source and said auxiliary load circuit, a control circuit for controlling the energy transmitted by said electric valves and said auxiliary electric valves comprising saturable transformer means for producing control voltages of peaked wave form, a static phase shifting circuit for controlling the phase of the peaked voltages produced by said saturable transformer means including a saturable inductive impedance device having a control winding, an electric valve including an anode, a cathode and a control member connected to control the energization of said control winding, means for controlling the energization of the control electrode of said last mentioned electric valve comprising means for producing a voltage dependent upon the magnitude of the current transmitted to said auxiliary load circuit, and means responsive to the voltage across said control winding for producing a voltage which opposes any change in the conductivity of said last mentioned electric valve caused by changes in the current transmitted to said auxiliary load circuit.

2. In combination, an alternating current supply circuit, an alternating current load circuit, electric valve means interconnecting said circuits for transmitting energy therebetween, an auxiliary load circuit having electric characteristics corresponding to the characteristics of said load circuit, auxiliary electric valves interconnecting said source and said auxiliary load circuit, a control circuit for controlling the energy transmitted by said electric valve means and said auxiliary electric valves comprising saturable transformer means for producing control voltages of peaked wave form, a static phase shifting circuit for controlling the phase of the peaked voltages produced by said saturable transformer means including a saturable inductive impedance device having a control winding, an electric valve including an anode, a cathode and a control member connected to control the energization of said control winding, means for controlling the energization of the control electrode of said last mentioned electric valve comprising means for producing a voltage dependent upon the magnitude of the current transmitted to said auxiliary load circuit and means for producing a voltage which opposes temporarily said last named voltage to retard changes in the conductivity of said last mentioned electric valve caused by changes in the current transmitted to said auxiliary load.

3. In combination, an alternating current supply circuit, a load circuit, electric translating apparatus interconnecting said circuit including electric valve means having a control electrode, means for energizing said control electrode to render said electric valve means periodically conductive to supply current to said load circuit for a predetermined number of half cycles of said alternating current supply circuit, an auxiliary load circuit, electric translating apparatus including electric valve means having a control electrode for controlling the transfer of energy between said supply circuit and said auxiliary load circuit, excitation transformer means including a plurality of secondary windings for controlling the conductivities of said electric valve means and said auxiliary electric valve means, and means for controlling the phase of the voltages impressed on said control members by said secondary windings comprising a static phase shifting circuit including a saturable inductive impedance device having a control winding, an electric valve including a control electrode for controlling the energization of said control winding, and means responsive to variations in an electrical condition of said auxiliary load for controlling continuously the impedance of said saturable inductive device to maintain the current supplied to said load circuit substantially independent of voltage changes of said supply circuit.

4. In combination, an alternating current supply circuit, a load circuit, electric translating apparatus interconnecting said circuits including electric valve means having a control electrode, means for energizing said control electrode with periodic voltages to control the transfer of energy between said circuits comprising transformer means having a primary winding, a static phase shifting circuit for controlling the phase of the periodic voltages impressed on the primary winding of said transformer means and including a saturable inductive impedance device having a control winding, means for controlling the energization of said control winding from said alternating current source including an electric valve having a control electrode, and a control circuit for controlling the energization of said last named control electrode comprising means for impressing thereon a fixed unidirectional voltage, a variable unidirectional voltage having a polarity opposing said first mentioned unidirectional voltage and variable in response to variations in an electrical condition to be controlled and means for producing a third voltage having a magnitude and direction dependent upon voltage changes across said control winding for retarding changes in the conductivity of said electric valve due to changes in the magnitude of said second mentioned unidirectional potential.

5. In combination, an alternating current supply circuit, a load circuit, means for controlling the transfer of energy between said circuits comprising a saturable inductive reactance device including a control winding, a source of alternating curernt voltage, an electric valve including a control member, said electric valve and said control winding being connected in series across said source of alternating voltage, a control circuit for controlling the energization of said control member comprising a source of alternating current voltage displaced in phase with respect to said first mentioned source of alternating voltage, a source of unidirectional voltage variable in magnitude in accordance with a condition to be controlled and a source of voltage having a magnitude and direction dependent upon changes in said unidirectional control voltage for preventing hunting action in the energization of said control winding.

6. In combination, an alternating current supply circuit, a load circuit, electric translating apparatus interconnecting said circuits including electric valve means having a control electrode, means for energizing said control electrode to control the transfer of energy between said circuits comprising a static phase shifting circuit including a saturable inductive impedance device having a control winding, means for controlling the energization of said control winding from said alternating current source including an electric valve having a control electrode, a control circuit for controlling the energization of the control electrode of said electric valve comprising means for deriving a control potential variable in response to changes in a condition to be controlled and an anti-hunting circuit including means responsive to voltage changes across said control winding for producing a potential opposing changes in said control potential to retard variations in said variable impedance caused by variations in said condition.

7. In combination, a supply circuit, a load circuit, electric translating apparatus interconnecting said circuits including electric valve means, a control circuit including a static phase shifting circuit for controlling the conductivities of said electric valve means, said static phase shifting circuit including a saturable inductive impedance device having a control winding, a circuit for controlling the energization of said control winding comprising a source of alternating voltage, an electric valve including a control member connected in series with said control winding and across said source of alternating voltage, means for variably energizing said control member to effect the variable energization of said control winding in accordance with an electrical condition to be controlled comprising a source of alternating current voltage having a lagging phase displacement with respect to the voltage impressed on the anode-cathode circuit of said electric valve means, a variable unidirectional voltage having a magnitude dependent upon variations in the condition to be controlled and means responsive to voltage changes across said control winding for modifying the energization of the control member of said electric valve to prevent hunting action of said control circuit.

HARRY L. PALMER.
GEORGE W. GARMAN.